(12) United States Patent
Hiroi et al.

(10) Patent No.: US 6,850,267 B2
(45) Date of Patent: Feb. 1, 2005

(54) VIDEO TELEPHONE SYSTEM AND TERMINAL DEVICE THEREFOR

(75) Inventors: Kazushige Hiroi, Machida (JP); Nobukazu Kondo, Ebina (JP); Kazuchika Ogiwara, Hitachinaka (JP); Tooru Yokozawa, Yokohama (JP); Takeo Tomokane, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/372,811

(22) Filed: Feb. 26, 2003

(65) Prior Publication Data

US 2003/0222973 A1 Dec. 4, 2003

(30) Foreign Application Priority Data

May 29, 2002 (JP) ........................................ 2002-154940

(51) Int. Cl.[7] .................................................. H04N 7/14
(52) U.S. Cl. ............................... 348/14.12; 348/14.05; 348/14.01; 379/93.17; 709/204
(58) Field of Search ........................ 348/14.01–14.16; 379/93.01, 93.08, 93.17, 93.28–93.34; 709/204

(56) References Cited

U.S. PATENT DOCUMENTS 5,510,829 A * 4/1996 Sugiyama et al. ........ 348/14.01
6,538,686 B2 * 3/2003 Hara et al. ............... 348/14.12

FOREIGN PATENT DOCUMENTS

| JP | A-11-112955 | 4/1999 | |
| JP | 11112955 A * | 4/1999 | ............ H04M/3/56 |
| JP | A-11-215481 | 8/1999 | |
| JP | 11215481 A * | 8/1999 | .......... H04N/7/173 |
| JP | A-2001-069472 | 3/2001 | |
| JP | 2001069472 A * | 3/2001 | ............ H04N/7/14 |

OTHER PUBLICATIONS

ITU–T H.245 Recommendation (Jul. 2001).

* cited by examiner

*Primary Examiner*—Wing F Chan
(74) *Attorney, Agent, or Firm*—Antonelli, Terry, Stout & Kraus, LLP

(57) ABSTRACT

A terminal device stores in a nonvolatile memory a video encoding method, a size expressed by pixels, a frame rate, a bit rate, and a key frame insertion interval suitable for reception. A receiving side terminal device notifies information to a sending side terminal. According to the information, the sending side terminal device encodes video data obtained by shooting an object and transmits encoded video data. Also, the sending side terminal device cuts, from the video data, video data of a size not exceeding a least size among a size of the video data obtained by the sending side terminal device, a size expressed by pixels suitable for transmission in the sending side terminal device, and a size expressed by pixels suitable for reception in the reception side terminal device. The sending side terminal device encodes and transmits the video data.

21 Claims, 10 Drawing Sheets

VIDEO TELEPHONE SYSTEM AND TERMINAL DEVICE THEREFOR

BACKGROUND OF THE INVENTION

The present invention relates to a video telephone system and a terminal device for the system which encodes a video image to communicate the encoded video image, and in particular, to a video telephone system and a terminal device for the system which conducts communications between terminal devices different in video processing capacity from each other.

The standards for video telephone systems include, for example, H.323 recommended by the telecommunication standardization sector of international telecommunication union (ITU-T). In association with the recommendation, the following recommendations of ITU-T are used to construct a video telephone system.

The recommendations are H.225.0 for call establishment, resolution of a communication party address, control-for communicability, and control for a band pass; H.245 to primarily negotiate terminal device's capability such like an encoding method of video and audio signals communicated between terminal devices, H.261 and H263 to encode video signals for transmission, and G711, G722, G.723.1, G728, and G729 to encode audio signals for transmission.

It is determined by H323 recommendation to use a realtime transport protocol (RTP), an RTP control protocol (RTCP) and TCP/UDP/IP as a transmission protocol of encoded audio/video data and a flow control protocol for the audio/video data. In conformity with the recommendations and protocols, the video telephone system can be constructed.

Particularly, H.245 recommendation allows a terminal device on a receiving side to notify, to a terminal on a sending side, an encoding method of video and audio signals which can be decoded by a terminal device on a receiving side. Moreover, the receiving side terminal device can specify as a decodable video size thereof, for example, a size determined for a common intermediate format (CIF) or a quarter CIF (QCIF) to notify the size to the sending side terminal device. Therefore, video signals can be communicated between terminal devices of mutually different types.

However, the display screen size varies between terminal devices and is indicated in units of pixels, namely, by various numbers of pixels. For example, some portable telephones and portable terminal devices of personal digital assistants (PDA) have a small-sized display screen in consideration of higher portability and reduction of production cost thereof. Conversely, the display screen is enlarged for higher visibility in some cases. Appropriate resolution of pictures also varies in units of pixels. When video signals of the size of CIF or QCIF are encoded to be transmitted to such a terminal device, performance of the terminal device cannot be fully obtained. Or, the sending side terminal device encodes a large amount of video signals and the receiving side terminal device decodes the signals including unnecessary signals. That is, the terminal devices must execute unnecessary processing. According to H.245, the display screen size of the receiving side terminal device can be notified as an optional parameter to the sending side terminal device. However, H.245 does not imply any use of the size notification to reduce the amount of video processing or displaying.

In some terminal devices, performance of the memory and the processor mounted on the device is restricted to reduce the price thereof. Resultantly, the decodable video size as well as the decodable video frame rate, the decodable bit rate, and the key frame insertion interval are restricted depending on cases. In this situation, when video signals received by a terminal device exceed the limitation of processing performance of the terminal device, an image produced using the video signals moves in an unnatural way. In a worst case, the received video signals cannot be decoded to display the image thereof.

In the description, "frame rate" is the number of pictures per second and "bit rate" is the amount of data per second expressed in units of bits. Moreover, "key frame" is a picture which is selected from the pictures of a video image for prediction and which can be decoded without referring to other pictures.

For video processing in relation to communication of video signals by terminal devices, when a sending side terminal device sends video signals, the terminal device must enlarge/minimize a video image obtained according to a size decodable by a receiving side terminal device to encode the video image. In addition, the sending side terminal device must enlarge/minimize a video image transmitting to the receiving side terminal device, according to a size of the own video display area of a display screen of the sending side terminal device to display the video image in the own video display area. At the same time, it is required that the received video signals are decoded and are enlarged/minimized according to a size of a video display area of the communicating party to display the video image in the communicating party video display area. This requires a large amount of memory areas and high processing performance. Consequently, there arises a problem that the terminal device is expensive.

There exist proposals for solving problems in the communication of video signals between terminal devices.

For example, JP-A-2001-069472 notifies a display mode on a receiving side to a sending side. However, in the article, a change of a display mode is notified to the sending side on the basis of a request from a user on the receiving side, and video processing performance of a terminal device on the receiving side is not notified to a terminal device on the sending side.

For example, according to JP-A-11-215481, a terminal device on a receiving side specifies a frame rate for a terminal device on a sending side. However, the frame rate is one of the attributes of the video processing method. According to the article, video processing performance of the receiving side terminal device is not notified to the sending side terminal device. Moreover, information regarding a display screen size of the receiving side terminal device is not notified to the sending side terminal device.

For example, JP-A-11-112955 discloses that information of a display screen size of a terminal device on a receiving side is notified to a terminal device on a sending side. However, the article copes with an image window in which a screen size of a communicating terminal device continuously changes with a lapse of time. An object of the technique is improvement in efficiency of communication lines, and video processing performance of the receiving side terminal device is not notified to the communicating terminal device.

Apart from the problems described above, it is necessary to appropriately recognize processing performance of the own communicating terminal device in the communication of video data therebetween.

SUMMARY OF THE INVENTION

It is therefore an object of the present invention to provide a video telephone system and a terminal device for the system in which video data can be communicated between the terminal devices without imposing any excessive load of video processing on each of the terminal devices having mutually different processing performance.

According to one aspect of the present invention, in the communication of video data between terminal devices having mutually different video processing performance, when the own terminal device is higher in video processing performance than the communicating terminal device, the own terminal device transmits video signals according to a video processing method and a display screen size suitable for the processing performance of the communicating terminal device.

Another aspect of the present invention, there is provided a video telephone system and a terminal device for the system which copes with terminal devices having various display screen sizes and in which even when the display screen size varies in units of pixels between the terminal devices, video signals can be efficiently encoded and communicated therebetween.

In the terminal device according to the present invention, even when the decodable, displayable, and receivable video size as well as the decodable, displayable, and receivable frame rate, bit rate, and key frame insertion interval are restricted, the video encoding and transmission can be conducted in conformity with the restriction, and the received video data can be displayed as a smoothly moving image or picture.

Also, according to the terminal device of the present invention, the amount of processing required as below is reduced to construct a video telephone system using a low-cost terminal device.
(1) Encoding of video signals for transmission
(2) Display of video image for transmission in own video display area
(3) Decoding of received video signals
(4) Display of received video image in video display area of communicating party According to a video telephone system and a terminal device therefor of the present invention, the horizontal size and the vertical size of a video image of the terminal device is stored in a nonvolatile memory. Also, the terminal device stores in the nonvolatile memory a video encoding method, a horizontal size expressed in particular units of pixels, a vertical size expressed in particular pixel units, a frame rate, a bit rate in a particular numeric value, and a key frame insertion interval which are suitable for encoding and transmission in the terminal device.

The terminal device also stores in the nonvolatile memory a video encoding method, a horizontal size expressed in particular pixel units, a vertical size expressed in particular pixel units, a frame rate, a bit rate in a particular numeric value, and a key frame insertion interval which are suitable for decoding, display, and reception in the terminal device. Under this condition, the receiving side terminal device reads from the nonvolatile memory the video encoding method, the horizontal size expressed in particular pixel units, the vertical size expressed in particular pixel units, the frame rate, the bit rate in a particular numeric value, and the key frame insertion interval which are suitable for decoding, display, and reception in the terminal device. The terminal device then notifies the information items to the sending side terminal device. According to the information items notified from the receiving side terminal device, the sending side terminal device determines an attribute of the video data for transmission to encode the video data.

The terminal device on the sending side determines the size of the video for transmission according to "size of the video image shot by the terminal device", "video size suitable for encoding and transmission in the sending side terminal device", and "the video size suitable for decoding, display, and reception in the receiving side terminal device notified in advance". The sending side terminal device obtains a video image of the determined size from the video data shot as above. The terminal device then encodes and transmits the obtained video data without enlarging or minimizing the video data.

The sending side terminal device enlarges or minimizes the video data obtained from the video data shot as above and displays the video data in the own video display area. The receiving side terminal device decodes the received video data and displays the image in the communicating party video display area without minimizing the video data.

Other objects, features and advantages of the invention will become apparent from the following description of the embodiments of the invention taken in conjunction with the accompanying drawings.

DESCRIPTION OF THE EMBODIMENTS

Figure 1:
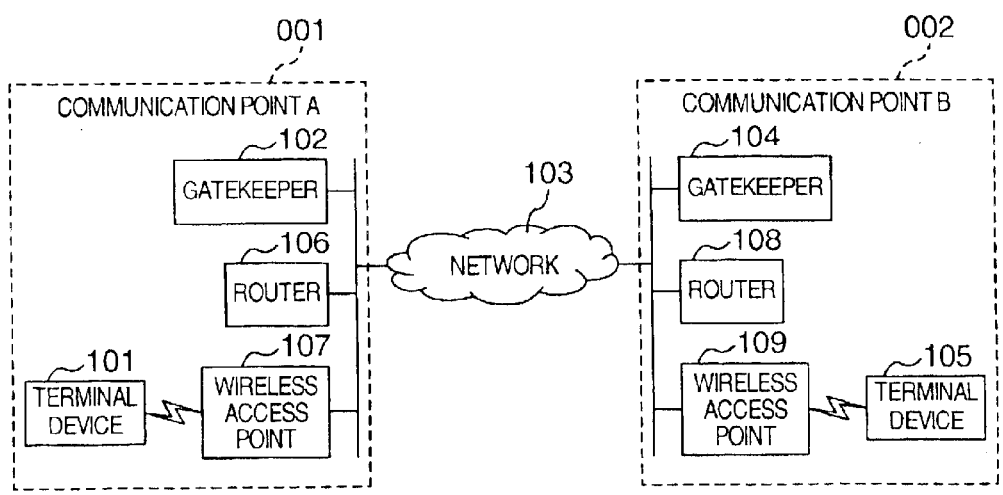
FIG. 1 is a diagram showing a configuration of an embodiment of a video telephone system according to the present invention.

Next, description will be given of an embodiment of the present invention by referring to the drawings.

FIG. 1 shows a configuration of an embodiment of a video telephone system according to the present invention.

As can be seen from FIG. 1, the embodiment of a video telephone system includes at least two communication points A 001 and B 002.

The communication point A 001 includes a terminal device 101, a wireless access point 107, a router 106, and a gatekeeper 102. The wireless access point 107, the router 106, and the gatekeeper 102 are connected to each other via a network, for example, a local-area network (LAN) and are also connected to a network 103.

Similarly, the communication point B 002 includes a terminal device 105, a wireless access point 109, a router 108, and a gatekeeper 104. The wireless access point 109, the router 108, and the gatekeeper 104 are connected to each other via a network, for example, a local-area network (LAN) and are also connected to a network 103.

In the configuration, the network 103 includes an Internet protocol (IP) network represented by the Internet, a telephone line network, or the integrated service digital network (ISDN).

Figure 2:
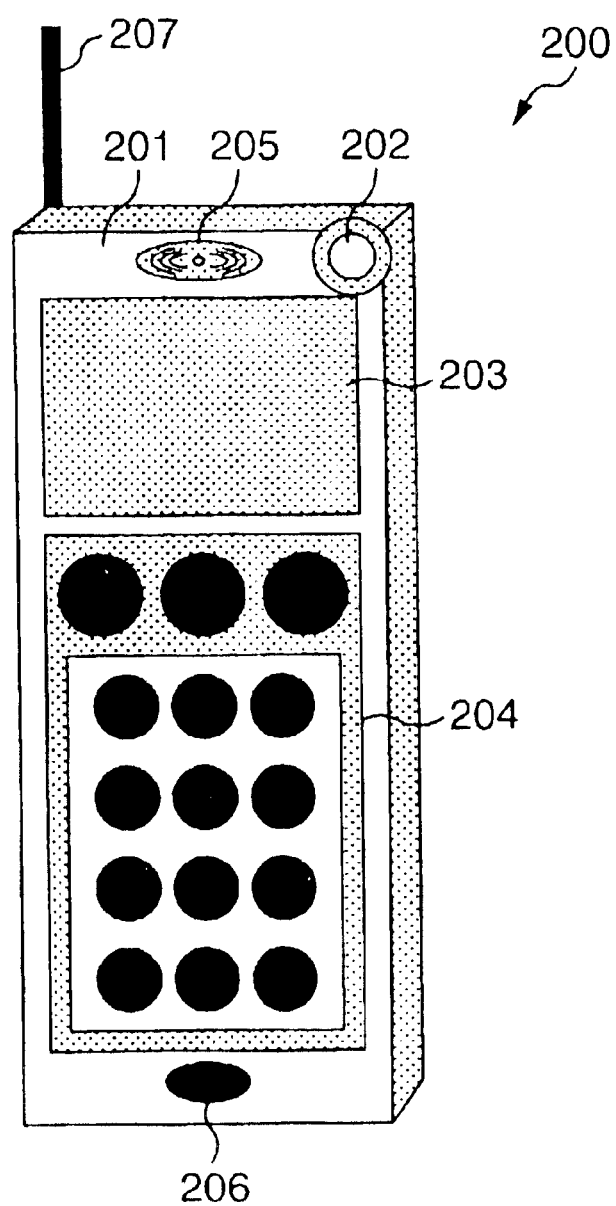
FIG. 2 is a diagram showing an example of a terminal device, particularly, a terminal device of portable telephone type in an embodiment of a video telephone system of the present invention.
Figure 3:
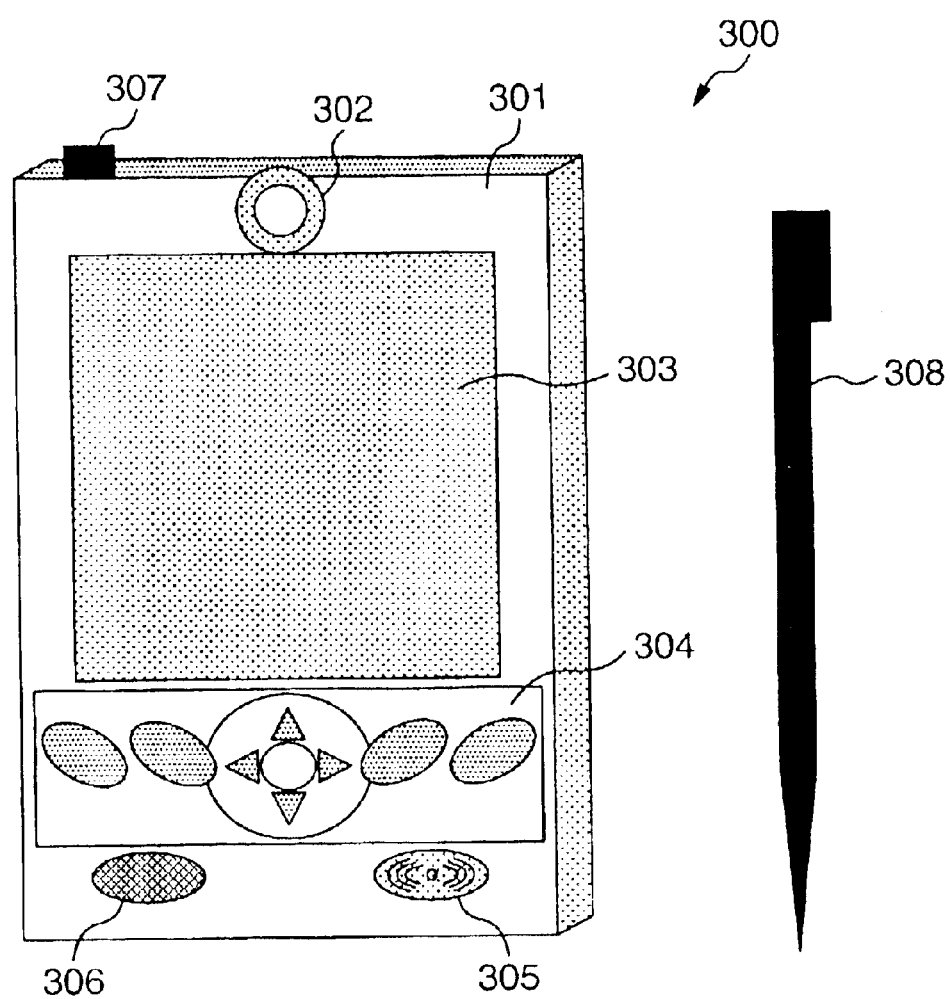
FIG. 3 is a diagram showing another example of a terminal device, particularly, a terminal device of PDA type in an embodiment of a video telephone system of the present invention.

Each of the terminal devices 101 and 105 is a terminal device for a user of the present system to communicate audio data and video data and may be, for example, a terminal device 200 of portable telephone type shown in FIG. 2 or a terminal device 300 of PDA type shown in FIG. 3.

In the configuration of FIGS. 2 and 3, reference numerals 201 and 301 indicate terminal device bodies respectively including cameras 202 and 302 to input video images, display screens 203 and 303 including, for example, liquid crystal to display images thereon, and operation button units 204 and 304. The body 301 also includes a touch pen 308 for a user to input data by bringing the touch pen 308 into contact with the screen 303. Also, the bodies 201 and 301 respectively include speakers 205 and 305 to produce sound and voice, microphones 206 and 306 to input sound and voice, and antennas 207 and 307 to communicate data via radio waves with the wireless access points 107 and 109, respectively.

The wireless access points 107 and 109 may be, for example, existing wireless LAN access points and can communicate data via radio waves with the terminal devices 101 and 105, respectively.

Although the wireless access point is, for example, a wireless LAN access point, a bluetooth access point, or a base station of portable telephones, any device having a function to connect a terminal device via a network to a communicating terminal device can be used in place of the wireless access point.

Each of the gatekeepers 102 and 104 includes, for example, a computer system and conducts call control between terminal devices, address control for terminal devices, and retrieval and acquisition of an address of a communicating terminal device using a telephone number as a retrieval key.

Each of the routers 106 and 108 includes, for example, a computer system and determines a communication route to a terminal device at a destination address to transmit data thereto.

In the system of these constituent components, when a user inputs a telephone number of the terminal device 105 as a destination, for example, from the terminal device 101, the telephone number of the terminal 105 is notified via the wireless access point 107 to the gatekeeper 102. The gatekeeper 102 retrieves and acquires an address of the terminal device 105 using the telephone number of the terminal device 105 as a retrieval key. The obtained address is then notified via the wireless access point 107 to the terminal device 101. It is resultantly possible for the terminal 101 to transmit data to the terminal 105 via the wireless access point 107, the router 106, the network 103, the router 108, and the wireless access point 109.

In this case, it is also possible for the terminal 105 to receive an address of the terminal 101 from the terminal 101 to transmit data thereto via the wireless access point 109, the router 108, the network 103, the router 106, and the wireless access point 107. That is, the terminal devices 101 and 105 can communicate data with each other.

In the description above, the gatekeepers, the routers, and the wireless access points can be implemented by existing devices respectively associated therewith, and hence detailed description thereof will be avoided. Next, description will be given of the configuration and operation of the terminal device.

Figure 4:
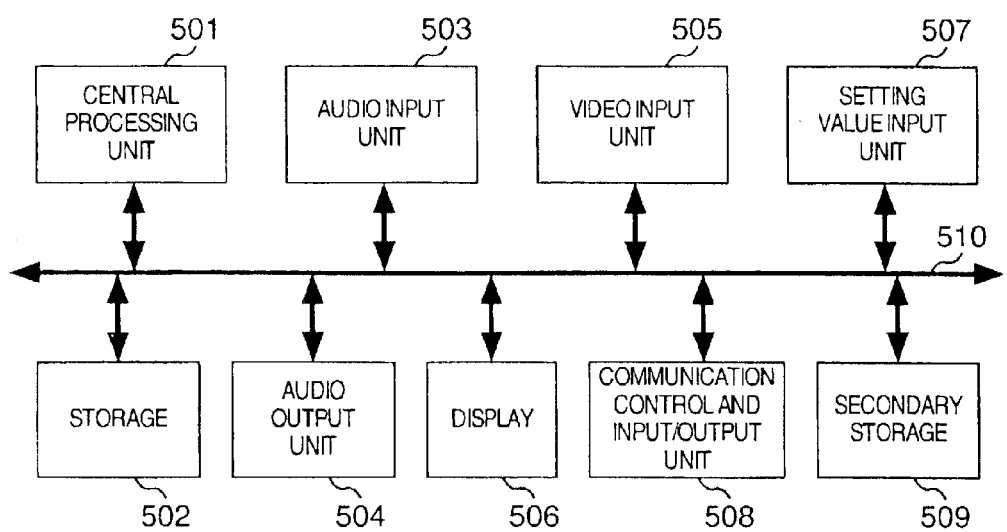
FIG. 4 is a diagram showing an example of a configuration of a terminal device in an embodiment of a video telephone system of the present invention.

First, the configuration of the terminal will be described. FIG. 4 shows a configuration of the terminal device in a block diagram. As can be seen from FIG. 4, the terminal device includes a central processing unit (CPU) 501, a storage 502, an audio input unit 503, an audio output unit 504, a video input unit 505, a display 506, a setting value input unit 507, a communication control and input/output unit 508, and a secondary storage 509. These constituent components are connected via a bus to each other to communicate data with each other.

The constituent components can be implemented by existing units or devices. That is, the setting value input unit 507 is implemented by, for example, an operation button unit. From the input unit 507, a user of the terminal device inputs, for example, operation setting information of the terminal device and a telephone number of a communicating party. The user of the terminal device can also indicate communication start and end points from the input unit 507. The communication control and input/output unit 508 includes, for example, a wireless LAN card of a wireless LAN and an antenna and communicates data with a wireless access point. The audio input unit 503 includes, for example, a microphone to input external sound and voice to the terminal device. The video input unit 505 includes, for example, a camera to input an external video image to the terminal device. The audio output unit 504 includes, for example, a speaker to produce sound and voice. The display 506 includes, for example, liquid crystal to display an image thereon.

The CPU 501 is for example a general processor to control operation of the terminal device according to programs prepared for operation thereof. The processor 501 acquires audio data and video data respectively from the audio input unit 503 and the video input unit 505, obtains necessary video data to display the data on the display 506, encodes the audio and video data to create a packet of the data, and transmits the packet via the communication control and input/output unit 508 to the destination terminal device.

The processor 501 also receives a packet via the unit 508, acquires encoded video and audio data from the received packet, decodes the video and audio data, delivers the decoded audio data to the audio output unit 504 to produce sound and voice, and delivers decoded video data to the display 506 to display an image thereon. The storage 502 includes, for example, a random access memory (RAM) and/or a read only memory (ROM) to store programs to be executed by the CPU 501, and data to be processed by the CPU 501 such as audio data inputted from the audio input unit 503, video data inputted from the video input unit 505, data to be inputted to or outputted from the communication control and input/output unit 508, video and audio data encoded by the CPU 501, and video and audio data decoded by the CPU 501. The secondary storage 509 includes, for example, a nonvolatile memory such as a flash memory in which telephone book data including a telephone number of the communicating party can be stored.

The secondary storage 509 also stores a horizontal size and a vertical size of a video image obtained by the video input unit 505. The horizontal size and the vertical size are stored in units of pixels. Also, the secondary storage 509 stores a video encoding method, a horizontal size expressed in particular units of pixels, a vertical size expressed in particular units of pixels, a frame rate, a bit rate in a particular numeric value, and a key frame insertion interval which are suitable for encoding and transmission in the terminal device. Moreover, the secondary storage 509 stores, when there exist a plurality of video encoding methods suitable for encoding and transmission in the terminal device, a horizontal size expressed in particular units of pixels, a vertical size expressed in particular units of pixels, a frame rate, a bit rate in a particular numeric value, and a key frame insertion interval which are suitable for encoding and transmission for each video encoding method.

Also, the secondary storage 509 stores a video encoding method, a horizontal size expressed in particular units of pixels, a vertical size expressed in particular units of pixels, a frame rate, a bit rate in a particular numeric value, and a key frame insertion interval which are suitable for decoding, display, and reception in the terminal device. The secondary storage 509 also stores, when there exist a plurality of video encoding methods suitable for decoding, display, and reception in the terminal device, a video encoding method, a horizontal size expressed in particular units of pixels, a vertical size expressed in particular units of pixels, a frame rate, a bit rate in a particular numeric value, and a key frame insertion interval which are suitable for decoding, display, and reception for each encoding method.

Figure 5:
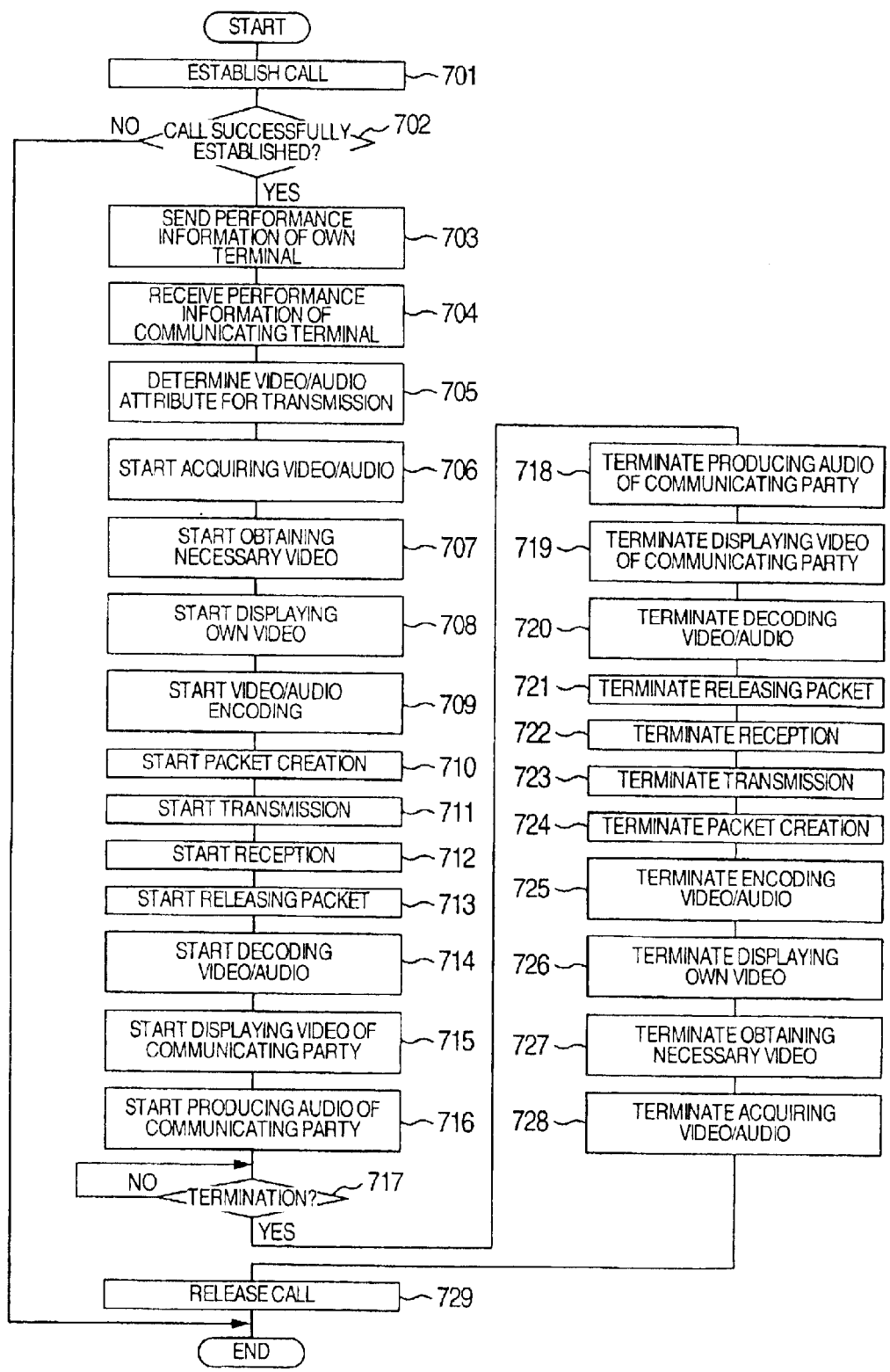
FIG. 5 is a flowchart showing operation of a terminal device in an embodiment of a video telephone system of the present invention.

Next, description will be given of the contents of operation of the terminal device achieved by the CPU thereof. FIG. 5 shows processing of programs executed by the CPU 501 of the terminal device as well as the contents of operation of the terminal device in a flowchart.

As shown in FIG. 5, the terminal device establishes a call via a gatekeeper between the terminal device and a terminal device as a communication party (step 701).

Subsequently, the terminal device makes a check to determine whether or not the call is successfully established in step 701 (step 702). If the call is not successfully established, the terminal device terminates the processing.

On the other hand, if it is determined in step 702 that the call is successfully established in step 701, the terminal device notifies information of performance thereof to the communicating terminal device (step 703). Specifically, as can be seen from FIG. 6; in addition to an audio encoding method and a bit rate suitable for encoding, transmission, decoding, and reception in the own terminal device; a video encoding method, a horizontal size expressed in particular units of pixels, a vertical size expressed in particular units of pixels, a frame rate, a bit rate in a particular numeric value, and a key frame insertion interval suitable for encoding, transmission, decoding, display, and reception in the terminal device 101' are sent to the terminal device 105' for each of the video encoding methods above.

Figure 7:
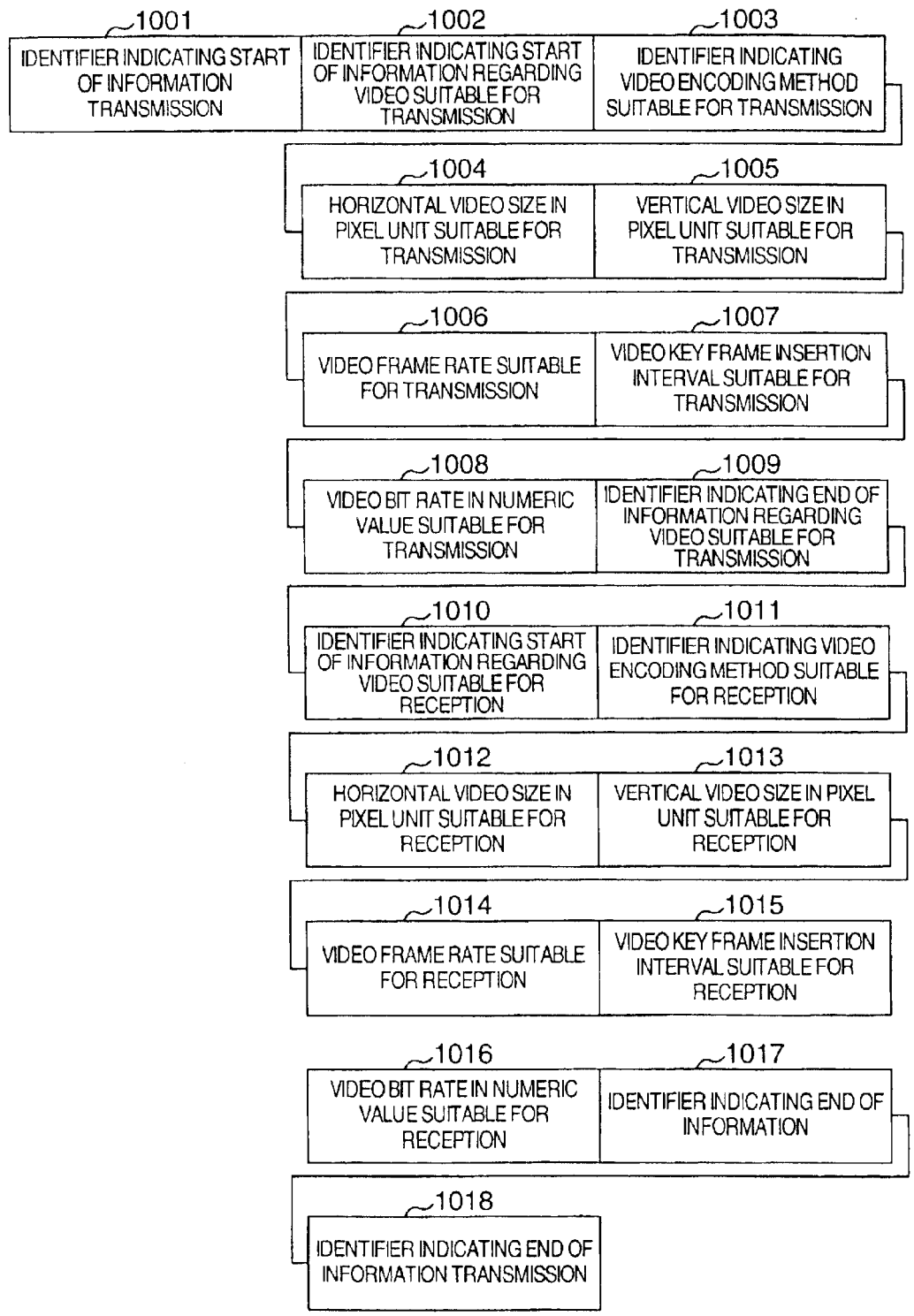
FIG. 7 is a diagram showing a configuration of data communicated between terminal devices in an embodiment of a video telephone system of the present invention to notify information to each other.

A method of notifying a video encoding method suitable for encoding, transmission, decoding, display, and reception in the terminal device 101', a horizontal size expressed in particular units of pixels, a vertical size expressed in particular units of pixels, a frame rate, a bit rate in a particular numeric value, and a key frame insertion interval to the terminal device 105' is, for example, as shown in FIG. 7.

That is, after an identifier indicating a transmission start point of information of video suitable for encoding, transmission, decoding, display, and reception in the terminal device, an identifier 1002 indicating a start point of information of video suitable for encoding and transmission in the terminal device is transmitted.

Thereafter, as information of video suitable for encoding and transmission in the terminal device, an identifier 1003 indicating a video encoding method, a video horizontal size 1004 in particular units of pixels, a video vertical size 1005 in particular units of pixels, a frame rate 1006, a key frame insertion interval 1007, a bit rate 1008 in a particular numeric value, and identifier 1009 indicating an end of information of video suitable for encoding and transmission in the terminal device are transmitted.

When there exist a plurality of video encoding methods suitable for encoding and transmission in the terminal device, a set of items 1002 to 1009 are also transmitted for each video encoding method. After the information of video suitable for encoding and transmission in the terminal device, an identifier 1010 indicating a start point of information of video suitable for decoding, display, and reception in the terminal device is transmitted.

Subsequently, as information of video suitable for decoding, display, and reception in the terminal device, an identifier 1011 indicating a video encoding method, a video horizontal size 1012 in particular units of pixels, a video vertical size 1013 in particular units of pixels, a frame rate 1014, a key frame insertion interval 1015, a bit rate 1016 in a particular numeric value, and identifier 1017 indicating an end of information of video suitable for decoding, display, and reception in the terminal device are transmitted.

When there exist a plurality of video encoding methods suitable for decoding, display, and reception in the terminal device, a set of items 1010 to 1017 are also transmitted for each video encoding method. Thereafter, an identifier 1018 indicating a transmission end point of information of video data suitable for encoding, transmission, decoding, display, and reception in the terminal device is finally transmitted.

In the processing, the identifiers 1001, 1018, 1002, 1009, 1010, and 1017 are mutually different identifiers or values.

Also, the identifiers 1003 and 1011 are predetermined identifiers or values, for example, "1" if the identifiers indicate those stipulated by H.263.

For each of the horizontal size 1004 and the vertical size 1005, the number of pixels corresponding to a size of video data suitable for encoding and transmission in the terminal device is transmitted. In this case, for example, when a terminal can encode and transmit a video image having a maximum horizontal size of 160 pixels and a maximum vertical size of 120 pixels, the horizontal size 1004 and the vertical size 1005 are set to "160" and "120", respectively.

The frame rate 1006, and the key frame insertion interval 1007, and the bit rate 1008, numeric values respectively of a frame rate, a key frame insertion interval, and a bit rate of video suitable for encoding and transmission in the terminal device are respectively transmitted. In this case, for example, when a terminal can encode and transmit video data at a maximum rate of 15 frames per second, with a maximum key frame insertion interval of five frames, and at a maximum bit rate of 60 kilobits per second (Kbps), the frame rate 1006, the key frame insertion interval 1007, and the bit rate 1008 are set to "15", "5", and "60000", respectively.

Similarly, for the horizontal size 1012 and the vertical size 1013, the numbers of pixels corresponding to a size of video data suitable for decoding, display, and reception in the terminal device are respectively transmitted. In this case, for example, when a terminal can decode, display, and receive a video image having a maximum horizontal size of 320 pixels and a maximum vertical size of 240 pixels, the horizontal size 1012 and the vertical size 1013 are set to "320" and "240", respectively.

For the frame rate 1014, the key frame insertion interval 1015, and the bit rate 1016, the numeric values of a frame rate, a key frame insertion interval, and a bit rate of video suitable for decoding, display, and reception in the terminal device are respectively transmitted.

In this case, when a terminal can decode, display, and receive a video image at a maximum rate of 30 frames per second, with a maximum key frame insertion interval of 15 frames, and at a maximum bit rate of 100 Kbps, the frame rate 1014, the key frame insertion interval 1015, and the bit rate 1016 are set to "30", "15", and "100000", respectively. In the operation, these data items may be sent as predetermined numbers of bits or may be sent together with predetermined identifiers. As a result, a delimiter between data items can be identified. Since these data items are beforehand stored, for example, in the secondary storage 509 of the terminal device, it is only necessary to read the data items therefrom to transmit the data items to the destination terminal device.

Figure 6:
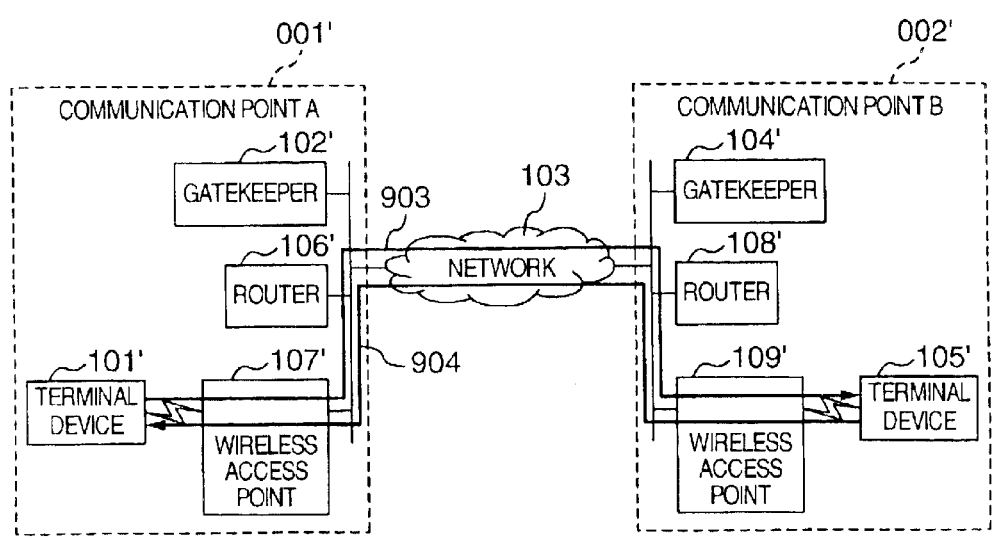
FIG. 6 is a diagram showing operation of terminal devices in an embodiment of a video telephone system of the present invention in which the terminal devices mutually communicate information of performance thereof such that each of the terminal devices obtains the information of performance of the communicating party.

Returning now to the description of FIG. 5, the terminal device obtains information of performance of the communicating terminal device by receiving the performance information of the communicating terminal sent therefrom as indicated by reference numeral 904 in FIG. 6 (step 704). This is achieved as follows. As already described in conjunction with step 703, the communicating terminal device sends an audio encoding method and a bit rate suitable for decoding and reception in the communicating terminal device and information of video data suitable for encoding, transmission, decoding, display, and reception shown in FIG. 7. The pertinent terminal device receives the information sent from the communicating terminal device.

Next, the terminal device determines attributes of video and audio signals to be transmitted (step 705). In this connection, "attributes" of video and audio signals are, for example, an encoding method and a bit rate of audio signals to be transmitted, and "attributes" of video signals are, for example, an encoding method, a size, a frame rate, a key frame insertion interval, and a bit rate of video signals to be transmitted.

While avoiding description of a method of determining an encoding method and a bit rate of audio signals to be transmitted, description will be given of a method of determining an encoding method, a size, a frame rate, a key frame insertion interval, and a bit rate of video signals to be transmitted.

First, the pertinent terminal device determines an encoding method of video signals to be transmitted by selecting an encoding method of video signals suitable for encoding and transmission in the terminal device which matches an encoding method of video signals suitable for decoding, display, and reception in the receiving side terminal device. The encoding method of video signals suitable for encoding and transmission in the terminal device can be obtained by reading data from the secondary storage 509 of the terminal device.

The information of performance of the communicating terminal device obtained in step 704 includes the encoding method of video signals suitable for decoding, display, and reception in the receiving side terminal device. Therefore, the pertinent terminal device can use the information obtained in step 704. Next, the size of video to be transmitted can be determined, for example, by first setting the horizontal size of video to be transmitted to a value equal to or less than a least value selected from "horizontal size of video data obtained in step 706", "horizontal size of video data expressed in particular units of pixels suitable for encoding and transmission in the terminal device", and "horizontal size of video expressed in particular units of pixels suitable for decoding, display, and reception in the receiving side terminal device". Further, the system sets the vertical size of video data to be transmitted to a value equal to or less than a least value selected from "vertical size of video data obtained in step 706", "vertical size of video data expressed in particular units of pixels suitable for encoding and transmission in the terminal device", and "vertical size of video data expressed in particular units of pixels suitable for decoding, display, and reception in the receiving side terminal device".

The horizontal size and the vertical size of video data obtained in step 706 by the terminal device and the horizontal size and the vertical size of video data expressed in particular units of pixels suitable for encoding and transmission in the terminal device can be obtained by reading data from the secondary storage 509 of the terminal device. The information of performance of the communicating terminal device obtained in step 704 includes the horizontal size and the vertical size of video data suitable for decoding, display, and reception in the receiving side terminal device. Therefore, the pertinent terminal device can use the information obtained in step 704.

Subsequently, the frame rate of video signals to be transmitted is selected as follows. The frame rate of video signals to be encoded and transmitted is set to, for example, a frame rate equal to or less than a lower frame rate selected from the frame rate of video signals suitable for encoding and transmission in the terminal device and the frame rate of video signals suitable for decoding, display, and reception in the receiving side terminal device.

The frame rate of video data suitable for encoding and transmission in the terminal device can be read from the secondary storage 509. Since the information of performance of the communicating terminal device obtained in step 704 includes the frame rate of video data suitable for decoding, display, and reception in the receiving side terminal device, the information of the frame rate can be used.

Next, the key frame insertion interval of video data to be encoded and transmitted is set to, for example, a key frame insertion interval equal to or less than a lower key frame insertion interval selected from the key frame insertion interval of video data suitable for encoding and transmission in the terminal device and that of video data suitable for decoding, display, and reception in the receiving side terminal device. The key frame insertion interval of video data suitable for encoding and transmission in the terminal device can be read from the secondary storage 509 of the terminal device. Since the information of performance of the communicating terminal device obtained in step 704 includes the key frame insertion interval of video data suitable for decoding, display, and reception in the receiving side terminal device, the information of the key frame insertion interval can be used.

The bit rate of video signals to be encoded and transmitted is set to, for example, a bit rate equal to or less than a lower bit rate selected from the frame rate of video signals in a particular numeric value suitable for encoding and transmission in the terminal device and the bit rate of video signals in a particular numeric value suitable for decoding, display, and reception in the receiving side terminal device. The bit rate of video data suitable in a particular numeric value for encoding and transmission in the terminal device can be read from the secondary storage 509 of the terminal device and hence can be used in subsequent processing. Since the information of performance of the communicating terminal device obtained in step 704 includes the bit rate of video signals in a particular numeric value suitable for decoding, display, and reception in the receiving side terminal device, the information of the bit rate can be used.

Returning now to the description of FIG. 5, the terminal device starts acquiring video signals from the video input unit and audio signals from the audio input unit (step 706). The processing to acquire video and audio signals is implemented by a program which is concurrently executed with other processing by the CPU 501.

Figure 8:
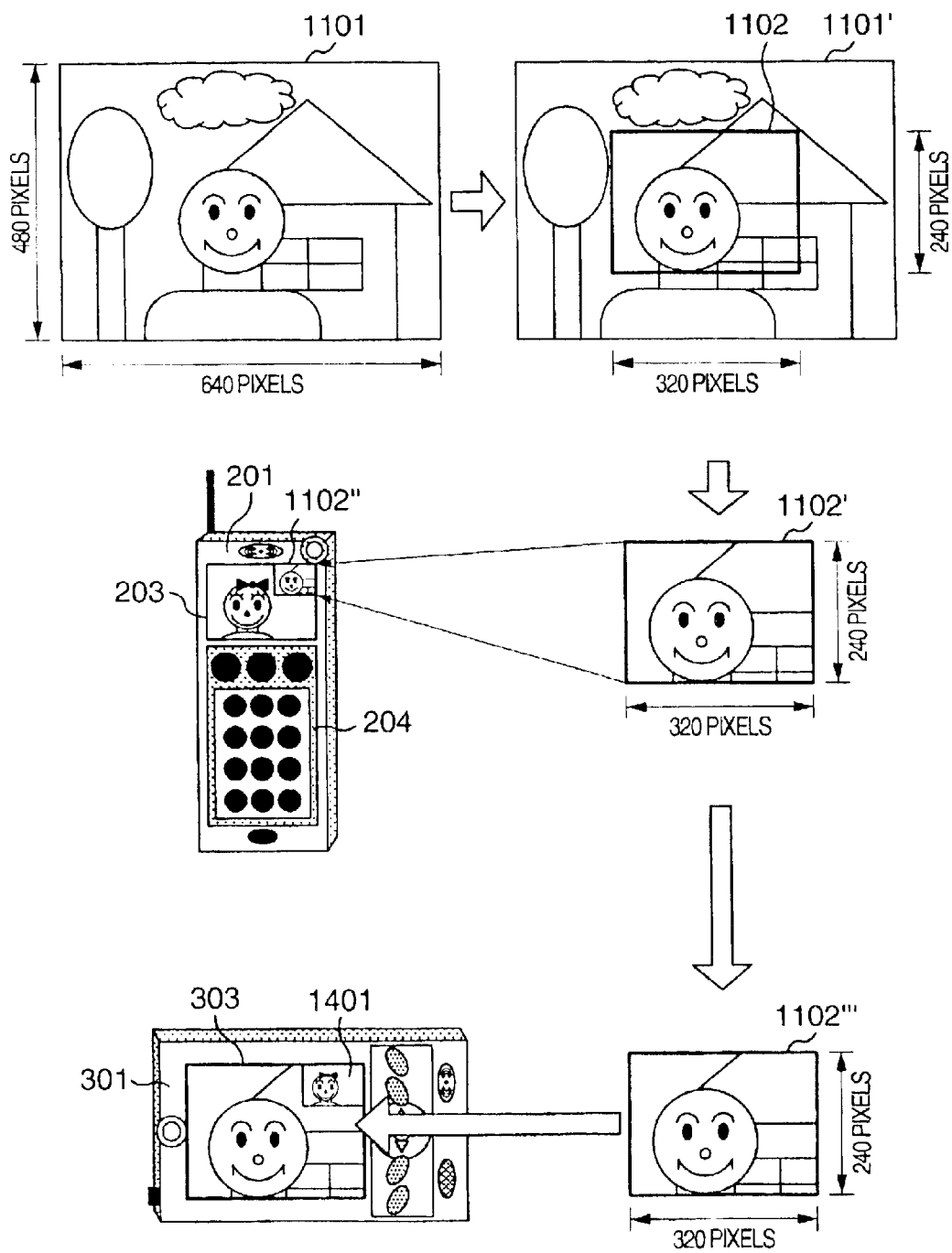
FIG. 8 is a diagram showing operation of a terminal device in an embodiment of a video telephone system of the present invention in which the terminal device obtains video data of the video size for transmission from the video data received from a video input unit and transmits the obtained video data to a communicating terminal device.

Next, the terminal device starts obtaining a video image of a video size determined for transmission in step 705 from the video data obtained by the video input unit 505 (step 707). This is achieved, for example, as shown in FIG. 8 in which a video image 1102 of a transmission video size is cut or obtained from the video image 1101 moved the video input unit 505 to the storage 502 to produce video data 1102', the obtained video image having a center on a center of the video image 1101. Or, the user may specify a cutting position from the setting value input unit 507. FIG. 8 shows an example in which the horizontal size and the vertical size of the video data moved from the video input unit 505 to the storage 502 are respectively 640 pixels and 480 pixels and the horizontal size and the vertical size of the video data determined in step 705 for transmission, namely, the video data to be cut from the original video data are respectively 320 pixels and 240 pixels. The video cutting operation is implemented as a program to be concurrently executed with other processing by the CPU 501.

The terminal device then starts displaying the video image obtained through the cutting operation (step 708). This is achieved as shown in FIG. 8 in which the video data 1102' is enlarged or minimized according to the size of an own video display area 1102" predetermined in the terminal device and is displayed in the display area 1102". The own video display processing is implemented as a program to be concurrently executed with other processing by the CPU 501.

The terminal device encodes the video data obtained through the video cutting operation and encodes the audio data obtained from the audio input unit 503 (step 709). The audio data is encoded according to the attribute of audio data for transmission determined in step 705. Also, the video data is encoded according to the attribute of video data for transmission determined in step 705. The video and audio data encoding processing implemented as a program to be concurrently executed with other processing by the CPU 501. However, according to one aspect of the present invention, the video size is determined in the video encoding operation as follows. The video image obtained in the video cutting operation has already the video size determined in step 705. Therefore, it is not required to enlarge or to minimize the video image. That is, the video is encoded with the video size kept unchanged.

Next, the terminal device starts multiplexing the audio and video data encoded by the video and audio data encoding operation to create a packet (step 710) and then starts transmitting the created packet to a terminal device as a communicating party (step 711). The packet creation processing and packet transmission processing are implemented as programs to be concurrently executed with other processing by the CPU 501.

The terminal device then receives a packet from the terminal device as the communicating party (step 712), obtains encoded video data and encoded audio data from the received packet (step 713), decodes the obtained video data and the obtained audio data (step 714), and displays the decoded image of the communicating party (step 715) and produces the decoded sound and-voice of the communicating party (step 716). The packet reception processing, the processing to obtain encoded video and audio data from the received packet, the processing to decode the encoded video and audio data, the processing to display the decoded video image of the communicating party, and the processing to produce the decoded sound and voice of the communicating party are implemented as programs to be concurrently executed with other processing by the CPU 501. However, according to one aspect of the present invention, the processing to display the decoded video image of the communicating party is executed as follows.

That is, the decoded video data 1102''' is equal in size to the encoded video data as well as to the video data 1102' cut from the video data obtained in the sending side terminal device as shown in FIG. 8. Therefore, the video size is equal to or less than the size of the display screen of the terminal device having received the video data. Consequently, as shown in FIG. 8, the decoded video image of the communicating party can be displayed on the display screen 303 without minimizing the decoded video data 1102'''. If the decoded video image 1102''' is less in size than the screen 303, it is also possible to place the decoded video image 1102''', for example, at a central point of the screen 303 with other areas displayed in black. Or, it is also possible to enlarge the decoded video image 1102''' according to the size of the display screen 303 to display the image thereon.

The terminal device then waits for an end indication from the user of the terminal device or data indicating termination of the call from the terminal device as the communicating party (step 717). If the end is indicated from the user of the terminal device or if the data indicating termination of the call from the communicating terminal device is received, the terminal device terminates producing of sound and voice of the communicating party (step 718) and then terminates displaying the image thereof (step 719). Also, the terminal device terminates decoding the video and audio data (step 720), terminates acquiring encoded video and audio data from the received packet (step 721), and terminates receiving a packet from the communicating terminal device (step 722) to thereby terminate receiving audio and video data from the communication party.

In step 717, when the end is indicated from the user of the terminal device or when the data indicating termination of the call is received from the communicating terminal device, the terminal device terminates transmitting a packet to the communicating terminal device (step 723), terminates creating a packet (step 724), and terminates encoding video and audio data to be transmitted (step 725). Also, the terminal device terminates displaying a video image on the own video display area (step 726), terminates cutting necessary video data from the video data received from the video input unit (step 727), and terminates acquiring video data from the video input unit and terminates acquiring audio data from the audio input unit (step 728). The termination processing can be achieved by terminating the respective programs.

Thereafter, the terminal device releases via the gatekeeper the call between the terminal device and the terminal device as the communicating party (step 729) and then terminates the processing in the terminal device. The method of releasing via the gatekeeper the call between the terminal device and the communicating terminal device, a procedure of the method, and the contents of processing of the method will not be described.

In the embodiment of the present invention, the secondary storage 509 beforehand stores information of video sizes in units of pixels. However, the present invention is not restricted by this embodiment. For example, the video sizes may be stored in units of bits, units of bytes, and units which can be converted into values in units of pixels of video sizes. In this case, information of each video size is converted for use into a value in units of pixels.

Also, in description of the embodiment of the present invention, the numbers of sizes of video data suitable for encoding and transmission in the terminal device are transmitted as "the horizontal size in particular units of pixels of video data suitable for encoding and transmission in the terminal device" and "the vertical size in particular units of pixels of video data suitable for encoding and transmission in the terminal device". However, the present invention is not restricted by this embodiment. For example, it is also possible to transmit numbers of bits or bytes indicating the video sizes or values which can be converted into values in units of pixels of the video sizes. In this case, the terminal device having received the information items converts the items into values in units of pixels.

Figure 9:
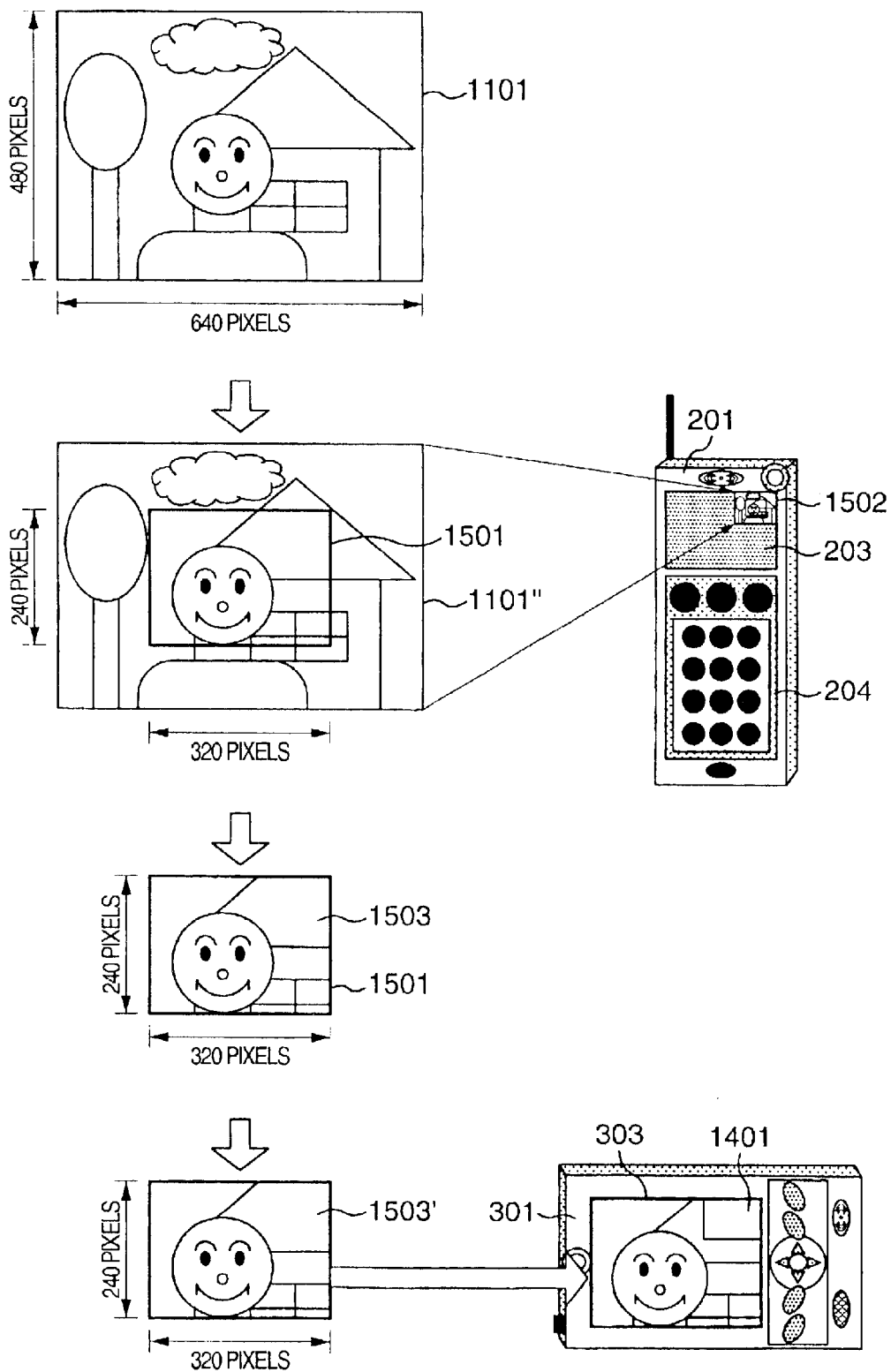
FIG. 9 is a diagram showing operation of a terminal device in an embodiment of a video telephone system of the present invention in which the terminal device obtains a video image from a video input unit and arranges a frame for the video image, the frame having a video size for transmission.

In the description above, video data of a video size determined in step 705 for transmission is cut from the video data obtained from the video input unit, the own video display processing displays the obtained video data on the own video display area, and the video data encoding processing encodes the obtained video data in step 709. However, it is possible to modify the processing, for example, as follows. That is, as shown in FIG. 9, the own video display processing marks the video data 1101 obtained from the video input unit 505, for example, by arranging a frame 1501 of the video size determined in step 705 for transmission and displays the video data 1101" in the frame on the own video display area 1502 in step 708. The video data encoding processing encodes the video data 1503 in the frame. In this case, the video data 1503' received and decoded by the receiving side terminal device is also equal in size to the video data 1101' in the frame thus prepared by the sending side terminal device. Therefore, the video data 1503' is in size equal to or less than the size of the display screen of the terminal device having received the video data. Consequently, the decoded video image of the communicating party can be displayed on the display screen 303 without minimizing the decoded video image 1503'. This leads to a similar advantage as that obtained by cutting the video data from the original video data as described above.

The marking position may be set such that the central point of the video data 1101 obtained from the video input unit 505 is used as a central point of the area to be marked. Or, the user may specify the marking position from the setting value input unit 507.

In the description above, the sending side terminal device obtains video data having the video size for transmission from the video data received from the video input unit or draws a frame of the video size for transmission to mark the video data for transmission and encodes the video data in the frame. However, the present invention is not restricted by the embodiment if the terminal device is a device having high performance such as a personal computer. In this case, the terminal device may minimize the video data received from the video input unit. Also, in the transmission of the video data, the terminal device may check performance of the terminal device to determine whether the terminal device cuts the video data from the video data received from the video input unit or minimizes the video data. According to a result from the determination, the terminal device cuts the video data from the video data received from the video input unit or minimizes the video data. In this case, as can be seen from FIG. 10, the CPU 501 determines in step 1001 whether the terminal device cuts the video data from the video data received from the video input unit or minimizes the video data. This is achieved, for example, as follows. The terminal device minimizes video data of several frames received from the video input unit according to the video size for transmission, encodes the video data, and minimizes the video data according to the size of the own video display area to determine whether or not the video data can be encoded according to the attribute of video data determined in step 705.

That is, in step 1001, the CPU 501 minimizes the video data received from the video input unit according to the video size for transmission, encodes the video data, and minimizes the video data according to the size of the own video display area. If it is determined that the video data can be encoded according to the attribute of video data determined in step 705, the terminal device determines that the video data from the video input unit is minimized. On the other hand, as a result of the processing, if it is not possible to encode the video data according to the attribute of video data determined in step 705, the terminal device determines that the video data is cut from the video data from the video input unit. Next, if it is determined in step 1001 that the video data is cut from the video data received from the video input unit, the CPU 501 starts the video cutting operation as described above. On the other hand, if it is determined in step 1001 that the video data from the video input unit is minimized, the CPU 501 starts minimizing the video data (step 1002).

In the own video display start processing in this case, if it is determined in step 1001 that the video data is cut from the video data received from the video input unit, the CPU 501 starts the video cutting operation as described above. If it is determined in step 1001 that the video data from the video input unit is minimized, the CPU 501 enlarges or minimizes the video data from the video input unit according the size of the own video display area and displays the video data on the display area (step 708').

Figure 10:
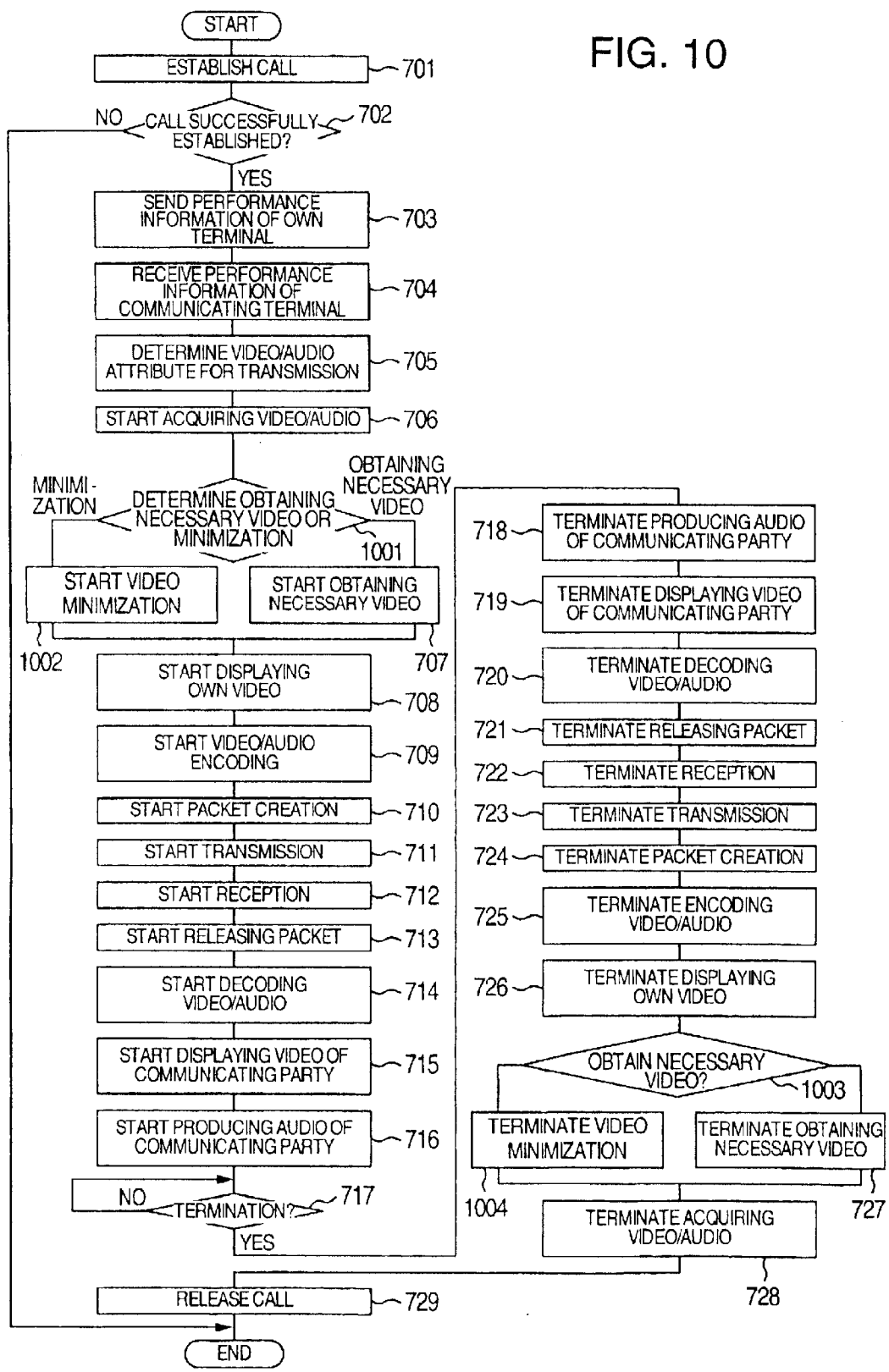
FIG. 10 is a flowchart showing operation of a terminal device in an embodiment of a video telephone system of the present invention.

To terminate the processing in the terminal device, a check is made to determine whether or not it is determined in step 1001 to cut the video data from the video data received from the video input unit (step 1003). If it is determined in step 1001 to cut the video data, the video cutting processing is terminated as above. If it is determined to minimize the video data from the video input unit, the video minimizing processing initiated in step 1002 is terminated. In FIG. 10, the same processing steps as those of FIG. 5 are assigned with the same reference numerals.

In the description of the embodiment of the present invention, the video and audio obtaining processing, the video data cutting processing, the video minimizing processing, the own video display processing, the video and audio data encoding processing, the packet creation processing, the packet receiving processing, the processing to obtain encoded video and audio data from the received packet, the processing to decode the encoded video and audio data, the processing to display decoded video image of the communicating party, and the processing to produce decoded sound and voice of the communicating party are respectively implemented as programs to be executed by the CPU 501. However, it is also possible to execute the processing by hardware.

According to the present invention, information can be efficiently communicated even if the display screens have mutually different attributes. Also, it is possible to reduce the amount of memory and the processing performance required for the terminal device, and hence an information communication system can be constructed using a low-cost terminal device.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A video telephone system for communicating video data between a first terminal device and a second terminal device having mutually different video processing performance, wherein:
   the first terminal device transmits, before reception of encoded video data, at least one video processing method for reception and a display screen size suitable for video receiving performance of the first terminal device to the second terminal device, the at least one video processing method for reception and the display screen size being notified in a form of at least one attribute; and
   the second terminal device beforehand stores at least one video processing method for transmission to transmit video data within a range of transmitting performance of the second terminal device,
   the second terminal device obtains, according to the at least one attribute notified from the first terminal device, video data for transmission from video data to be processed, the video data for transmission having a size equal to or less than the display screen size notified from the first terminal device,
   the second terminal device selects, from the at least one video processing method for transmission, a video processing method not exceeding video processing performance of the video processing method notified from the first terminal device, and
   the second terminal device processes video data for transmission according to the video processing method for transmission thus selected to produce encoded video data of the video data for transmission and transmits the encoded video data to the first terminal device.

2. A video telephone system according to claim 1, wherein when the video data to be processed by the second terminal device exceeds the display screen size notified from the first terminal device, the second terminal device cuts, from the video data to be processed, the video data for transmission to produce the encoded video data of the video data for transmission having the display screen size notified from the first terminal device.

3. A video telephone system according to claim 1, wherein the at least one attribute representing the display screen size notified from the first terminal device includes data regarding a number of horizontal pixels and a number of vertical pixels of a display screen.

4. A video telephone system according to claim 1, wherein the at least one attribute includes a key frame insertion interval of video data in the video processing method for reception associated therewith.

5. A video telephone system according to claim 1, wherein the at least one attribute includes a frame rate of video data in the video processing method for reception associated therewith.

6. A video telephone system according to claim 1, wherein the at least one attribute includes a bit rate of video data in the video processing method for reception associated therewith.

7. A terminal device for use in a video telephone system, comprising:
   video input means for inputting external video data to the terminal device;
   video data encoding means for encoding input video data from the video input means;
   communicating means for communicating data;
   storage means for beforehand storing at least one video processing method to transmit video data within a range of transmitting performance of the terminal device;
   communicating terminal performance acquiring means for acquiring via the communicating means at least one video processing method and a display screen size suitable for video receiving performance of a terminal device as a communicating party;
   transmission video producing means for obtaining, according to the at least one video processing method and the display screen size acquired by the communicating terminal performance acquiring means, video data for transmission having a size equal to or less than the display screen size acquired from the input video data from the video input means; selecting from the at least one video processing method beforehand stored in the storage means, a video processing method not exceeding video processing performance of the video processing method for reception; processing, by the video data encoding means in the video processing method thus selected, the video data for transmission and producing encoded video data of the video data for transmission, and transmitting the encoded video data to the communicating terminal device; and
   display means for displaying the video data for transmission.

8. A terminal device according to claim 7, further comprising means for specifying a cutting position, when the input video data exceeds the display screen size thus notified, to cut video data for transmission from the input video data, the video data for transmission having the display screen size.

9. A terminal device according to claim 8, wherein when the input video data exceeds the display screen size thus notified, the display means displays the input video data together with a cutting position thereover.

10. A terminal device for use in a video telephone system, comprising:

a storage for beforehand storing at least one video processing method for reception suitable for video receiving performance of the terminal device;

a communicating means for communicating data;

own terminal performance transmitting means for transmitting, before reception of encoded video data, the at least one video processing method and a display screen size stored in the storage means, via the communicating means to a communicating terminal device as a communicating party;

video data decoding means for decoding encoded video data of video data having a size equal to or less than the display screen size received from the communicating terminal device via the communicating means according to a video processing method not exceeding video processing performance of the video processing method for reception and thereby obtaining decoded video data; and display means for displaying the decoded video data.

11. A terminal device for use in a video telephone system, comprising:

audio input means for inputting external audio data to the terminal device;

video input means for inputting external video data to the terminal device;

audio data encoding means for encoding the audio data inputted from the audio input means;

video data encoding means for encoding the video data inputted from the video input means;

audio data decoding means for decoding encoded audio data inputted thereto;

video data decoding means for decoding encoded video data inputted thereto to produce decoded video data;

audio output means for producing sound and voice according to audio data decoded;

display means for displaying video data decoded;

a communicating means for communicating data;

a storage for beforehand storing at least one video processing method for reception suitable for video receiving performance of the terminal device and at least one video processing method to transmit video data within a range of transmitting performance of the terminal device;

own terminal performance transmitting means for transmitting the at least one video processing method and a display screen size stored in the storage means via the communicating means;

communicating terminal performance acquiring means for acquiring via the communicating means at least one video processing method and a display screen size suitable for video receiving performance of a terminal device as a communicating party; and transmission video producing means for obtaining, according to the at least one video processing method and the display screen size acquired by the communicating terminal performance acquiring means, video data for transmission having a size equal to or less than the display screen size acquired from the input video data from the video input means; selecting, from the at least one video processing method beforehand stored in the storage means, a video processing method not exceeding video processing performance of the video processing method for reception; processing, according to the video processing method thus selected, the video data for transmission and producing encoded video data of the video data for transmission, and transmitting the encoded video data to the communicating terminal device.

12. A terminal device according to claim 11, wherein:

each the video processing method and the display screen size to be communicated are represented in a form of at least one attribute; and at least one attribute representing the display screen size to be communicated includes data regarding a number of horizontal pixels and a number of vertical pixels of a display screen.

13. A terminal device according to claim 11, wherein:

each the video processing method to be communicated is represented in a form of at least one attribute; and the at least one attribute includes a key frame insertion interval of video data in the video processing method for reception respectively associated therewith.

14. A terminal device according to claim 11, wherein:

each the video processing method to be communicated is represented in a form of at least one attribute; and the at least one attribute includes a key frame rate of video data in the video processing method for reception respectively associated therewith.

15. A terminal device according to claim 11, wherein:

each the video processing method to be communicated is represented in a form of at least one attribute; and the at least one attribute includes a bit rate of video data in the video processing method for reception respectively associated therewith.

16. A terminal device according to claim 11, wherein the display means displays the video data for transmission in a partial area beforehand determined in a display area of the decoded video data.

17. A method of communicating video data between a first terminal device and a second terminal device having mutually different video processing performance, comprising the steps of:

notifying, by the first terminal device, before reception of encoded video data, at least one video processing method for reception and a display screen size suitable for video receiving performance of the first terminal device to the second terminal device, the video processing method for reception and the display screen size being notified in a form of at least one attribute; and obtaining, by the second terminal device according to the at least one attribute notified from the first terminal device, video data for transmission from video data to be processed, the video data for transmission having a size equal to or less than the display screen size notified from the first terminal device, processing the video data for transmission according to a video processing method not exceeding video processing performance of the video processing method notified from the first terminal device to produce encoded video data of the video data for transmission, and transmitting the encoded video data to the first terminal device.

18. A method of communicating video data between a first terminal device and a second terminal device having mutually different video processing performance, comprising the steps of:

notifying, by the first terminal device, before reception of encoded video data, at least one video processing method for reception and a display screen size suitable for video receiving performance of the first terminal device to the second terminal device, the video processing method for reception and the display screen size being notified in a form of at least one attribute;

beforehand storing, by the second terminal device, at least one video processing method for transmission to transmit video data within a range of transmitting performance of the second terminal device; and obtaining, by the second terminal device according to the at least one attribute notified from the first terminal device, video data for transmission from video data to be processed, the video data for transmission having a size equal to or less than the display screen size notified from the first terminal device, selecting, by the second terminal device, from the at least one video processing method for transmission beforehand stored by the second terminal device, a video processing method not exceeding video processing performance of the video processing method notified from the first terminal device, and processing the video data for transmission according to the video processing method for transmission thus selected to produce encoded video data of the video data for transmission, and transmitting the encoded video data to the first terminal device.

19. A video telephone system for communicating video data between at least two terminal devices including a first terminal device and a second terminal device, wherein the first terminal device notifies information regarding a key frame insertion interval of video data suitable for decoding, display and reception in the first terminal device to the second terminal device; and the second terminal device processes, according to the received information regarding the key frame insertion interval of video data, video data and then transmits the video data processed according to the received information to the first terminal device.

20. A terminal device for use in a video telephone system, comprising:

audio input means for inputting external audio data to the terminal device;

video input means for inputting external video data to the terminal device;

audio data encoding means for encoding the audio data inputted from the audio input means;

video data encoding means for encoding the video data inputted from the video input means;

audio data decoding means for decoding encoded audio data inputted thereto;

video data decoding means for decoding encoded video data inputted thereto to produce decoded video data;

audio output means for producing sound and voice according to audio data decoded;

display means for displaying video data decoded;

communicating means for communicating audio and video data encoded;

communicating terminal performance acquiring means for acquiring information regarding a size of video data suitable for decoding, display, and reception in a terminal device as a communicating party; and transmission video producing means for producing video data for transmission using the video data inputted from the video input means, wherein:

the transmission video producing means determines as a video size for transmission a size less than or equal to the size of video data received by the communicating terminal performance acquiring means suitable for decoding, display, and reception in a terminal device as a communicating party;

the transmission video producing means cuts video data of the video size for transmission from the video data inputted from the video input means and thereby produces video data for transmission; and the video data encoding means encodes the video data produced by the transmission video producing means.

21. A video telephone system according to claim 19, wherein the second terminal device determines, as a key frame insertion interval of video data for encoding and transmission, a key frame insertion interval less than or equal to a lower key frame insertion interval between a key frame insertion interval of video data suitable for encoding and transmission by the second terminal device and the key frame insertion interval received from the first terminal device.

* * * * *